(12) United States Patent
Chen et al.

(10) Patent No.: US 12,081,807 B2
(45) Date of Patent: Sep. 3, 2024

(54) TRANSFORM UNIT PARTITION METHOD FOR VIDEO CODING

(71) Applicant: Huawei Technologies Co., Ltd., Shenzhen (CN)

(72) Inventors: Jianle Chen, San Diego, CA (US); Yin Zhao, San Diego, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 358 days.

(21) Appl. No.: 17/482,006

(22) Filed: Sep. 22, 2021

(65) Prior Publication Data

US 2022/0014796 A1 Jan. 13, 2022

Related U.S. Application Data

(63) Continuation of application No. PCT/US2020/024014, filed on Mar. 20, 2020.
(Continued)

(51) Int. Cl.
*H04N 19/96* (2014.01)
*H04N 19/122* (2014.01)
(Continued)

(52) U.S. Cl.
CPC ........... *H04N 19/96* (2014.11); *H04N 19/122* (2014.11); *H04N 19/14* (2014.11); *H04N 19/184* (2014.11); *H04N 19/70* (2014.11)

(58) Field of Classification Search
None
See application file for complete search history.

(56) References Cited

U.S. PATENT DOCUMENTS

| | | | |
|---|---|---|---|
| 2012/0230411 A1 | 9/2012 | Liu et al. | |
| 2012/0281928 A1 | 11/2012 | Cohen et al. | |
| 2013/0136180 A1* | 5/2013 | Yang | H04N 19/60 375/240.13 |
| 2013/0279820 A1 | 10/2013 | Cohen et al. | |

(Continued)

FOREIGN PATENT DOCUMENTS

| | | |
|---|---|---|
| CN | 103348651 A | 10/2013 |
| CN | 103503461 A | 1/2014 |

(Continued)

OTHER PUBLICATIONS

JVET-D0117r1, "Multi-Type-Tree," Joint Video Exploration Team (JVET) of ITU-T SG 16 WP 3 and ISO/IEC JTC 1/SC 29/WG 11, 4th Meeting: Chengdu, CN, Oct. 15-21, 2016, 3 pages.

(Continued)

*Primary Examiner* — Jessica M Prince
(74) *Attorney, Agent, or Firm* — Conley Rose, P.C.

(57) ABSTRACT

A method of decoding includes partitioning a rectangular transform tree node (TTN) using either a vertical binary tree split or a horizontal binary tree split to generate square child TTNs when a maximum transform unit (TU) size for the TTN is smaller than either dimension of the TTN. The method further includes partitioning the child TTNs using a quadtree split to generate transform units (TUs) when the first child TTN dimension and the second child TTN dimension are larger than the maximum TU size, determining that the child TTNs are TUs when the first child TTN dimension and the second child TTN dimension are less than or equal to the maximum TU size, applying the TUs to transform coefficients to generate residuals, and generating a reconstructed block based on the residuals.

18 Claims, 10 Drawing Sheets

Related U.S. Application Data

(60) Provisional application No. 62/822,533, filed on Mar. 22, 2019.

(51) Int. Cl.
    *H04N 19/14*         (2014.01)
    *H04N 19/184*      (2014.01)
    *H04N 19/70*        (2014.01)

(56) References Cited

U.S. PATENT DOCUMENTS

| | | |
|---|---|---|
| 2014/0050266 A1 | 2/2014 | Zhang et al. |
| 2015/0249828 A1 | 9/2015 | James et al. |
| 2017/0006309 A1* | 1/2017 | Liu ................... H04N 19/597 |
| 2017/0150156 A1 | 5/2017 | Zhang et al. |
| 2017/0150186 A1 | 5/2017 | Zhang et al. |
| 2017/0208336 A1 | 7/2017 | Li et al. |
| 2018/0070110 A1 | 3/2018 | Chuang et al. |
| 2019/0075328 A1* | 3/2019 | Huang ................ H04N 19/119 |
| 2021/0266581 A1* | 8/2021 | Jung ................... H04N 19/60 |

FOREIGN PATENT DOCUMENTS

| | | |
|---|---|---|
| JP | 2014204311 A | 10/2014 |
| WO | 2014071439 A1 | 5/2014 |
| WO | 2020197957 A1 | 10/2020 |

OTHER PUBLICATIONS

"Advanced Video Coding for Generic Audiovisual Services," Series H: Audiovisual and Multimedia Systems Infrastructure of Audiovisual Services—Coding of Moving Video, ITU-T H.264, Jun. 2019, 836 pages.

"High Efficiency Video Coding," Series H: Audiovisual and Multimedia Systems Infrastructure of Audiovisual Services—Coding of Moving Video, ITU-T H.265, Dec. 2016, 664 pages.

Kim, et al, "Block Partitioning Structure in the HEVC Standard," Dec. 31, 2012, retrieved from the Internet May 26, 2020, IEEE Transactions on Circuits and Systems for Video Technology, vol. 22, No. 12, URL <: http://citeseerx.st.psu.edu/viewdoc/download? doi= 10.1.1.352.1947&rep=rep 1&type=pdf>, pp. 1697-1706.

Document: JVET-M1002-v2, Chen, J., et al., "Algorithm description for Versatile Video Coding and Test Model 4 (VTM 4)", XP030255391, The Joint Video Exploration Team of ITU-T SG 16 WP 3 and ISO/IEC JTC 1/SC 29/WG11, 13th Meeting: Marrakech, MA, Jan. 9-18, 2019, 62 pages.

Document: JVET-M1001-v7, Bross, B., et al., "Versatile Video Coding (Draft 4)," Joint Video Experts Team (JVET) of ITU-T SG 16 WP 3 and ISO/IEC JTC 1/SC 29/WG 11, 13th Meeting: Marrakech, MA, Jan. 9-18, 2019, 300 pages.

"Implicit Transform Unit Partitioning in HEVC," 2013 Picture Coding Symposium (PCS), IEEE, Dec. 8, 2013, pp. 213-216.

Shan, N, et al., "An Effective CU Splitting Algorithm in Inter Prediction of HEVC," Journal of Electronics & Information Technology vol. 38 No. 5, May 2016, 8 pages.

Benjamin Bross, Jianle Che, and Shan Liu, Versatile Video Coding (Draft 6), Joint Video Experts Team (JVET) of ITU-T SG 16 WP 3 and ISO/IEC JTC 1/SC 29/WG 11, JVET-O2001 (version 14). 15th Meeting: Gothenburg, SE, Jul. 31, 2019 (year/month/day), p. 73.

Benjamin Bross, Jianle Chen, and Shan Liu, Versatile Video Coding (Draft 4), Joint Video Experts Team (JVET) of ITU-T SG 16 WP 3 and ISO/IEC JTC 1/SC 29/WG 11, JVET-M1001 (version 7), 13th Meeting: Marrakech, MA, Mar. 17, 2019 (year/month/day), pp. 49.

Ling Li, et al., Maximum transform size signaling in HLS, Joint Video Experts Team (JVET) of ITU-T SG 16 WP 3 and ISO/IEC JTC 1/SC 29/WG 11, JVET-N0227-v1, 14th Meeting: Geneva, CH, Mar. 19, 2019, pp. 1-3.

Xin Zhao, Xiang Li, and Shan Liu, CE6-related: Configurable max transform size in VVC, Joint Video Experts Team (JVET) of ITU-T SG 16 WP 3 and ISO/IEC JTC 1/SC 29/WG 11, JVET-N0362, 14th Meeting: Geneva, CH, Mar. 13, 2019 (year/month/day), pp. 1-8.

Krit Panusopone, Limin Wang, and Xue Fang, Implicit Transform Unit Partitioning in HEVC, PCS 2013, IEEE, 2013, pp. 213-216.

\* cited by examiner

TRANSFORM UNIT PARTITION METHOD FOR VIDEO CODING

CROSS-REFERENCE TO RELATED APPLICATIONS

This patent application is a continuation of International Application No. PCT/US2020/024014, filed Mar. 20, 2020 by Jianle Chen, et. al., and titled "Transform Unit Partition Method for Video Coding," which claims the benefit of U.S. Provisional Patent Application No. 62/822,533, filed Mar. 22, 2019, by Jianle Chen, et al., and titled "Transform Unit Partitioning for Video Coding," which is hereby incorporated by reference.

TECHNICAL FIELD

In general, this disclosure describes techniques for video compression in video coding. More specifically, this disclosure describes techniques that allow for transform unit partitioning without violating the pipeline block structure.

BACKGROUND

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in image quality are desirable.

SUMMARY

A first aspect relates to a method of decoding a coded video bitstream implemented by a video decoder. The method includes partitioning, by the video decoder, a transform tree node (TTN) using a vertical binary tree split when a first TTN dimension is greater than a maximum transform unit (TU) size for the TTN and when the first TTN dimension is greater than a second TTN dimension; applying, by the video decoder, transform units (TUs) to transform coefficients to generate residuals after the TTN has been partitioned; and generating, by the video decoder, a reconstructed block based on the residuals.

The method provides techniques whereby a transform tree node (TTN) having a first TTN dimension different than a second TTN dimension (e.g., a rectangular TTN) is initially partitioned using either a vertical binary tree split or a horizontal binary tree split when a maximum transform unit (TU) size for the TTN is smaller than the first TTN dimension, which generates child TTNs having a first child TTN dimension equal to a second child TTN dimension (e.g., square child TTNs). When the first child TTN dimension and the second child TTN dimension are larger than the maximum TU size, the child TTNs are partitioned using a quadtree split to generate transform units (TUs). Otherwise, the child TTNs are the TUs as initially split. By partitioning the TTN in this manner (e.g., vertical or horizontal binary tree split of the TTN prior to any quadtree split), the pipeline block structure used in the versatile video coding (VVC) standard is not violated. Therefore, the coder/decoder (a.k.a., "codec") in video coding is improved (e.g., the integrity of the S×S pipeline structure or process is maintained) relative to current codecs. As a practical matter, the improved video coding process may eliminate errors or failures in the codec, which offers the user a better user experience when videos are sent, received, and/or viewed.

Optionally, in any of the preceding aspects, another implementation of the aspect provides, that the partitioning of the TTN generates generate child TTNs having a first child TTN dimension equal to a second child TTN dimension.

Optionally, in any of the preceding aspects, another implementation of the aspect provides, partitioning, by the video decoder, the child TTNs using a quadtree split to generate the TUs when the first child TTN dimension and the second child TTN dimension are larger than the maximum TU size; and determining, by the video decoder, that the child TTNs are the TUs when the first child TTN dimension and the second child TTN dimension are less than or equal to the maximum TU size.

Optionally, in any of the preceding aspects, another implementation of the aspect provides, the first TTN dimension and the second TTN dimension are measured in a number of luma samples.

Optionally, in any of the preceding aspects, another implementation of the aspect provides, the first child TTN dimension and the second child TTN dimension are measured in a number of luma samples.

Optionally, in any of the preceding aspects, another implementation of the aspect provides, a TTN depth of all TUs in the TTN is set to one (1).

Optionally, in any of the preceding aspects, another implementation of the aspect provides, a TTN depth of all TUs in the TTN is set according to a number of splits needed to obtain the TUs.

Optionally, in any of the preceding aspects, another implementation of the aspect provides, the vertical binary tree split is implemented according to the following syntax: verSplitFirst=(tbWidth>MaxTbSizeY && tbWidth>tbHeight)?1:0.

Optionally, in any of the preceding aspects, another implementation of the aspect provides, the TTN is partitioned using the vertical binary tree split when the first TTN dimension is 2N luma samples, the second TTN dimension is N luma samples, and the maximum TU size is ½ N luma samples.

Optionally, in any of the preceding aspects, another implementation of the aspect provides, wherein N=64 luma samples.

A second aspect relates to a method of encoding implemented by a video encoder. The method includes partitioning, by the video encoder, a transform tree node (TTN) using a vertical binary tree split when a first TTN dimension is greater than a maximum transform unit (TU) size for the TTN and when the first TTN dimension is greater than a second TTN dimension; applying, by the video encoder, transform units (TUs) to residuals to generate transform coefficients after the TTN has been partitioned; encoding, by the video encoder, the transform coefficients into a bitstream; and storing, by the video encoder, the bitstream for transmission toward a video decoder.

The method provides techniques whereby a transform tree node (TTN) having a first TTN dimension different than a second TTN dimension (e.g., a rectangular TTN) is initially partitioned using either a vertical binary tree split or a horizontal binary tree split when a maximum transform unit (TU) size for the TTN is smaller than the first TTN dimension, which generates child TTNs having a first child TTN dimension equal to a second child TTN dimension (e.g., square child TTNs). When the first child TTN dimension and the second child TTN dimension are larger than the maximum TU size, the child TTNs are partitioned using a quadtree split to generate transform units (TUs). Otherwise, the child TTNs are the TUs as initially split. By partitioning the TTN in this manner (e.g., vertical or horizontal binary tree split of the TTN prior to any quadtree split), the pipeline block structure used in the versatile video coding (VVC) standard is not violated. Therefore, the coder/decoder (a.k.a., "codec") in video coding is improved (e.g., the integrity of the S×S pipeline structure or process is maintained) relative to current codecs. As a practical matter, the improved video coding process may eliminate errors or failures in the codec, which offers the user a better user experience when videos are sent, received, and/or viewed.

Optionally, in any of the preceding aspects, another implementation of the aspect provides, that the partitioning of the TTN generates generate child TTNs having a first child TTN dimension equal to a second child TTN dimension.

Optionally, in any of the preceding aspects, another implementation of the aspect provides, partitioning, by the video decoder, the child TTNs using a quadtree split to generate the TUs when the first child TTN dimension and the second child TTN dimension are larger than the maximum TU size; and determining, by the video decoder, that the child TTNs are the TUs when the first child TTN dimension and the second child TTN dimension are less than or equal to the maximum TU size.

Optionally, in any of the preceding aspects, another implementation of the aspect provides, the first TTN dimension and the second TTN dimension are measured in a number of luma samples.

Optionally, in any of the preceding aspects, another implementation of the aspect provides, the first child TTN dimension and the second child TTN dimension are measured in a number of luma samples.

Optionally, in any of the preceding aspects, another implementation of the aspect provides, a TTN depth of all TUs in the TTN is set to one (1).

Optionally, in any of the preceding aspects, another implementation of the aspect provides, a TTN depth of all TUs in the TTN is set according to a number of splits needed to obtain the TUs.

Optionally, in any of the preceding aspects, another implementation of the aspect provides, the vertical binary tree split is implemented according to the following syntax: verSplitFirst=(tbWidth>MaxTbSizeY && tbWidth>tbHeight)?1:0.

Optionally, in any of the preceding aspects, another implementation of the aspect provides, the TTN is partitioned using the vertical binary tree split when the first TTN dimension is 2N luma samples, the second TTN dimension is N luma samples, and the maximum TU size is ½ N luma samples.

Optionally, in any of the preceding aspects, another implementation of the aspect provides, N=64 luma samples.

A third aspect relates to a decoding device. The decoding device includes a receiver configured to receive a coded video bitstream; a memory coupled to the receiver, the memory storing instructions; and a processor coupled to the memory, the processor configured to execute the instructions to cause the decoding device to: partition a transform tree node (TTN) using a vertical binary tree split when a first TTN dimension is greater than a maximum transform unit (TU) size for the TTN and when the first TTN dimension is greater than a second TTN dimension; apply transform units (TUs) to transform coefficients to generate residuals after the TTN has been partitioned; and generate a reconstructed block based on the residuals.

The decoding device provides techniques whereby a transform tree node (TTN) having a first TTN dimension different than a second TTN dimension (e.g., a rectangular TTN) is initially partitioned using either a vertical binary tree split or a horizontal binary tree split when a maximum transform unit (TU) size for the TTN is smaller than the first TTN dimension, which generates child TTNs having a first child TTN dimension equal to a second child TTN dimension (e.g., square child TTNs). When the first child TTN dimension and the second child TTN dimension are larger than the maximum TU size, the child TTNs are partitioned using a quadtree split to generate transform units (TUs). Otherwise, the child TTNs are the TUs as initially split. By partitioning the TTN in this manner (e.g., vertical or horizontal binary tree split of the TTN prior to any quadtree split), the pipeline block structure used in the versatile video coding (VVC) standard is not violated. Therefore, the coder/decoder (a.k.a., "codec") in video coding is improved (e.g., the integrity of the S×S pipeline structure or process is maintained) relative to current codecs. As a practical matter, the improved video coding process may eliminate errors or failures in the codec, which offers the user a better user experience when videos are sent, received, and/or viewed.

Optionally, in any of the preceding aspects, another implementation of the aspect provides, the decoding device further comprises a display configured to display an image generated using the reconstructed block.

A fourth aspect relates to an encoding device. The encoding device includes a memory containing instructions; a processor coupled to the memory, the processor configured to implement the instructions to cause the encoding device to: partition a transform tree node (TTN) using a vertical binary tree split when a first TTN dimension is greater than a maximum transform unit (TU) size for the TTN and when the first TTN dimension is greater than a second TTN dimension; applying, by the video encoder, transform units (TUs) to residuals to generate transform coefficients after the TTN has been partitioned; and encode the transform coefficients into a bitstream; and a transmitter coupled to the processor, the transmitter configured to transmit the bitstream toward a video decoder.

The encoding device provides techniques whereby a transform tree node (TTN) having a first TTN dimension different than a second TTN dimension (e.g., a rectangular TTN) is initially partitioned using either a vertical binary tree split or a horizontal binary tree split when a maximum transform unit (TU) size for the TTN is smaller than the first TTN dimension, which generates child TTNs having a first child TTN dimension equal to a second child TTN dimension (e.g., square child TTNs). When the first child TTN dimension and the second child TTN dimension are larger than the maximum TU size, the child TTNs are partitioned using a quadtree split to generate transform units (TUs). Otherwise, the child TTNs are the TUs as initially split. By partitioning the TTN in this manner (e.g., vertical or horizontal binary tree split of the TTN prior to any quadtree split), the pipeline block structure used in the versatile video coding (VVC) standard is not violated. Therefore, the coder/decoder (a.k.a., "codec") in video coding is improved (e.g., the integrity of the S×S pipeline structure or process is maintained) relative to current codecs. As a practical matter, the improved video coding process may eliminate errors or failures in the codec, which offers the user a better user experience when videos are sent, received, and/or viewed.

Optionally, in any of the preceding aspects, another implementation of the aspect provides, the memory stores the bitstream prior to the transmitter transmitting the bitstream toward the video decoder.

A fifth aspect relates to a coding apparatus. The coding apparatus includes a receiver configured to receive a picture to encode or to receive a bitstream to decode; a transmitter coupled to the receiver, the transmitter configured to transmit the bitstream to a decoder or to transmit a decoded image to a display; a memory coupled to at least one of the receiver or the transmitter, the memory configured to store instructions; and a processor coupled to the memory, the processor configured to execute the instructions stored in the memory to perform any of the methods disclosed herein.

The coding apparatus provides techniques whereby a transform tree node (TTN) having a first TTN dimension different than a second TTN dimension (e.g., a rectangular TTN) is initially partitioned using either a vertical binary tree split or a horizontal binary tree split when a maximum transform unit (TU) size for the TTN is smaller than the first TTN dimension, which generates child TTNs having a first child TTN dimension equal to a second child TTN dimension (e.g., square child TTNs). When the first child TTN dimension and the second child TTN dimension are larger than the maximum TU size, the child TTNs are partitioned using a quadtree split to generate transform units (TUs). Otherwise, the child TTNs are the TUs as initially split. By partitioning the TTN in this manner (e.g., vertical or horizontal binary tree split of the TTN prior to any quadtree split), the pipeline block structure used in the versatile video coding (VVC) standard is not violated. Therefore, the coder/decoder (a.k.a., "codec") in video coding is improved (e.g., the integrity of the S×S pipeline structure or process is maintained) relative to current codecs. As a practical matter, the improved video coding process may eliminate errors or failures in the codec, which offers the user a better user experience when videos are sent, received, and/or viewed.

A sixth aspect relates to a system. The system includes an encoder; and a decoder in communication with the encoder, wherein the encoder or the decoder includes the decoding device, the encoding device, or the coding apparatus disclosed herein.

The system provides techniques whereby a transform tree node (TTN) having a first TTN dimension different than a second TTN dimension (e.g., a rectangular TTN) is initially partitioned using either a vertical binary tree split or a horizontal binary tree split when a maximum transform unit (TU) size for the TTN is smaller than the first TTN dimension, which generates child TTNs having a first child TTN dimension equal to a second child TTN dimension (e.g., square child TTNs). When the first child TTN dimension and the second child TTN dimension are larger than the maximum TU size, the child TTNs are partitioned using a quadtree split to generate transform units (TUs). Otherwise, the child TTNs are the TUs as initially split. By partitioning the TTN in this manner (e.g., vertical or horizontal binary tree split of the TTN prior to any quadtree split), the pipeline block structure used in the versatile video coding (VVC) standard is not violated. Therefore, the coder/decoder (a.k.a., "codec") in video coding is improved (e.g., the integrity of the S×S pipeline structure or process is maintained) relative to current codecs. As a practical matter, the improved video coding process may eliminate errors or failures in the codec, which offers the user a better user experience when videos are sent, received, and/or viewed.

A seventh aspect relates to a means for coding. The means for coding includes receiving means configured to receive a picture to encode or to receive a bitstream to decode; transmission means coupled to the receiving means, the transmission means configured to transmit the bitstream to a decoding means or to transmit a decoded image to a display means; storage means coupled to at least one of the receiving means or the transmission means, the storage means configured to store instructions; and processing means coupled to the storage means, the processing means configured to execute the instructions stored in the storage means to perform any of the methods disclosed herein.

The means for coding provides techniques whereby a transform tree node (TTN) having a first TTN dimension different than a second TTN dimension (e.g., a rectangular TTN) is initially partitioned using either a vertical binary tree split or a horizontal binary tree split when a maximum transform unit (TU) size for the TTN is smaller than the first TTN dimension, which generates child TTNs having a first child TTN dimension equal to a second child TTN dimension (e.g., square child TTNs). When the first child TTN dimension and the second child TTN dimension are larger than the maximum TU size, the child TTNs are partitioned using a quadtree split to generate transform units (TUs). Otherwise, the child TTNs are the TUs as initially split. By partitioning the TTN in this manner (e.g., vertical or horizontal binary tree split of the TTN prior to any quadtree split), the pipeline block structure used in the versatile video coding (VVC) standard is not violated. Therefore, the coder/decoder (a.k.a., "codec") in video coding is improved (e.g., the integrity of the S×S pipeline structure or process is maintained) relative to current codecs. As a practical matter, the improved video coding process may eliminate errors or failures in the codec, which offers the user a better user experience when videos are sent, received, and/or viewed.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
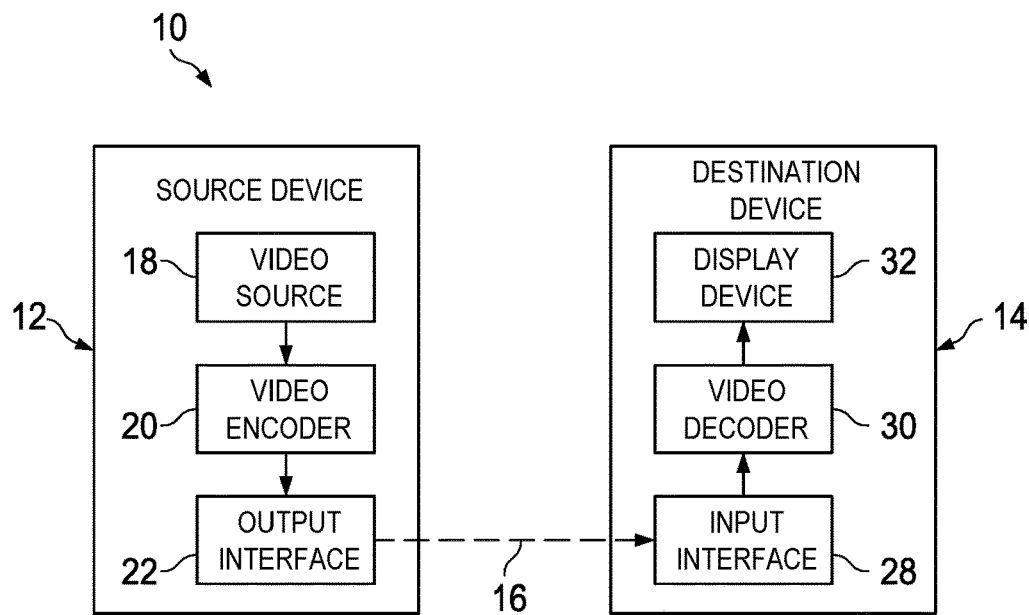
FIG. 1 is a block diagram illustrating an example coding system that may utilize partitioning techniques.

FIG. 1 is a block diagram illustrating an example coding system 10 that may utilize video coding techniques as described herein. As shown in FIG. 1, the coding system 10 includes a source device 12 that provides encoded video data to be decoded at a later time by a destination device 14. In particular, the source device 12 may provide the video data to destination device 14 via a computer-readable medium 16. Source device 12 and destination device 14 may comprise any of a wide range of devices, including desktop computers, notebook (e.g., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, digital video disks (DVD)s, Compact Disc Read-Only Memories (CD-ROMs), flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), a file transfer protocol (FTP) server, network attached storage (NAS) devices, or a local disk drive. Destination device 14 may access the encoded video data through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, coding system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of the source device 12 and/or the video decoder 30 of the destination device 14 may be configured to apply the techniques for video coding. In other examples, a source device and a destination device may include other components or arrangements. For example, source device 12 may receive video data from an external video source, such as an external camera. Likewise, destination device 14 may interface with an external display device, rather than including an integrated display device.

The illustrated coding system 10 of FIG. 1 is merely one example. Techniques for video coding may be performed by any digital video encoding and/or decoding device. Although the techniques of this disclosure generally are performed by a video coding device, the techniques may also be performed by a video encoder/decoder, typically referred to as a "CODEC." Moreover, the techniques of this disclosure may also be performed by a video preprocessor. The video encoder and/or the decoder may be a graphics processing unit (GPU) or a similar device.

Source device 12 and destination device 14 are merely examples of such coding devices in which source device 12 generates coded video data for transmission to destination device 14. In some examples, source device 12 and destination device 14 may operate in a substantially symmetrical manner such that each of the source and destination devices 12, 14 includes video encoding and decoding components. Hence, coding system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video.

In some cases, when video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., group of pictures (GOPs). Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard presently under development, and may conform to the HEVC Test Model (HM). Alternatively, video encoder 20 and video decoder 30 may operate according to other proprietary or industry standards, such as the International Telecommunications Union Telecommunication Standardization Sector (ITU-T) H.264 standard, alternatively referred to as Moving Picture Expert Group (MPEG)-4, Part 10, Advanced Video Coding (AVC), H.265/HEVC, or extensions of such standards. The techniques of this disclosure, however, are not limited to any particular coding standard. Other examples of video coding standards include MPEG-2 and ITU-T H.263. Although not shown in FIG. 1, in some aspects, video encoder 20 and video decoder 30 may each be integrated with an audio encoder and decoder, and may include appropriate multiplexer-demultiplexer (MUX-DEMUX) units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device. A device including video encoder 20 and/or video decoder 30 may comprise an integrated circuit, a microprocessor, and/or a wireless communication device, such as a cellular telephone.

Figure 2:
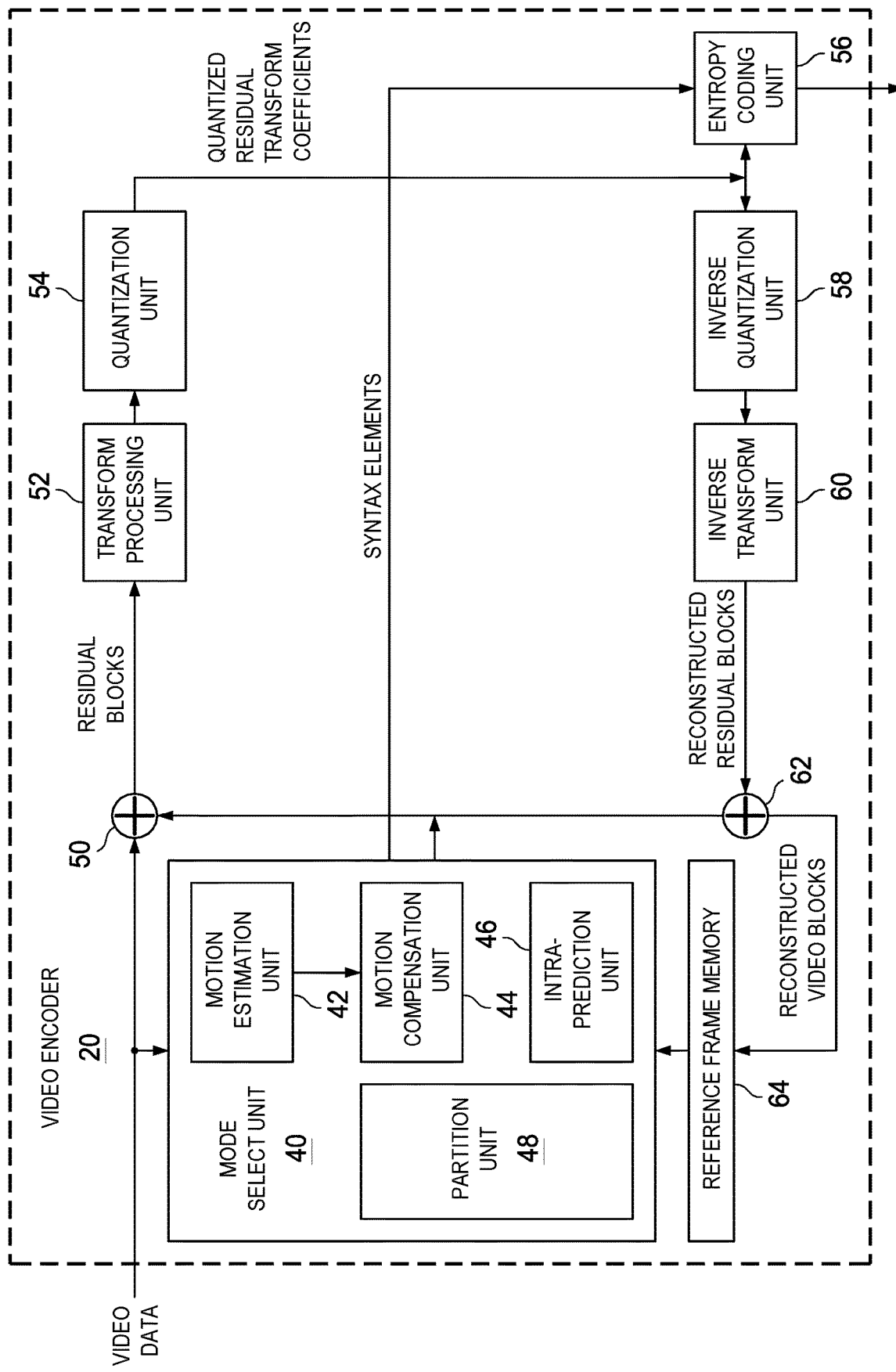
FIG. 2 is a block diagram illustrating an example video encoder that may implement partitioning techniques.

FIG. 2 is a block diagram illustrating an example of video encoder 20 that may implement video coding techniques. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional (a.k.a., uni prediction) prediction (P mode) or bi-prediction (a.k.a., bi prediction) (B mode), may refer to any of several temporal-based coding modes.

As shown in FIG. 2, video encoder 20 receives a current video block within a video frame to be encoded. In the example of FIG. 2, video encoder 20 includes mode select unit 40, reference frame memory 64, summer 50, transform processing unit 52, quantization unit 54, and entropy coding unit 56. Mode select unit 40, in turn, includes motion compensation unit 44, motion estimation unit 42, intra-prediction (a.k.a., intra prediction) unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into largest coding units (LCUs), and partition each of the LCUs into sub-coding units (sub-CUs) based on rate-distortion analysis (e.g., rate-distortion optimization). Mode select unit 40 may further produce a quad-tree data structure indicative of partitioning of a LCU into sub-CUs. Leaf-node CUs of the quad-tree may include one or more prediction units (PUs) and one or more transform units (TUs). TUs contain coefficients for spatial block transform and quantization. That is, TUs are a spatial transform that can be applied to convert residual values into transform coefficients or convert transform coefficients back into residual values.

The present disclosure uses the term "block" to refer to any of a CU, PU, or TU, in the context of HEVC, or similar data structures in the context of other standards (e.g., macroblocks and sub-blocks thereof in H.264/AVC). A CU includes a coding node, PUs, and TUs associated with the coding node. A size of the CU corresponds to a size of the coding node and is square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction (a.k.a., inter prediction) mode encoded. PUs may be partitioned to be non-square in shape. Syntax data associated with a CU may also describe, for example, partitioning of the CU into one or more TUs according to a quad-tree. A TU can be square or non-square (e.g., rectangular) in shape.

Mode select unit 40 may select one of the coding modes, intra- or inter-, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy coding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference frame memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference frame memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

In addition, intra-prediction unit 46 may be configured to code depth blocks of a depth map using a depth modeling mode (DMM). Mode select unit 40 may determine whether an available DMM mode produces better coding results than an intra-prediction mode and the other DMM modes, e.g., using rate-distortion optimization (RDO). Data for a texture image corresponding to a depth map may be stored in reference frame memory 64. Motion estimation unit 42 and motion compensation unit 44 may also be configured to inter-predict depth blocks of a depth map.

After selecting an intra-prediction mode for a block (e.g., a conventional intra-prediction mode or one of the DMM modes), intra-prediction unit 46 may provide information indicative of the selected intra-prediction mode for the block to entropy coding unit 56. Entropy coding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation.

Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used.

Transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy coding unit 56 entropy codes the quantized transform coefficients. For example, entropy coding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy coding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference frame memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference frame memory 64. The reconstructed video block may be used by motion estimation unit 42 and motion compensation unit 44 as a reference block to inter-code a block in a subsequent video frame.

Figure 3:
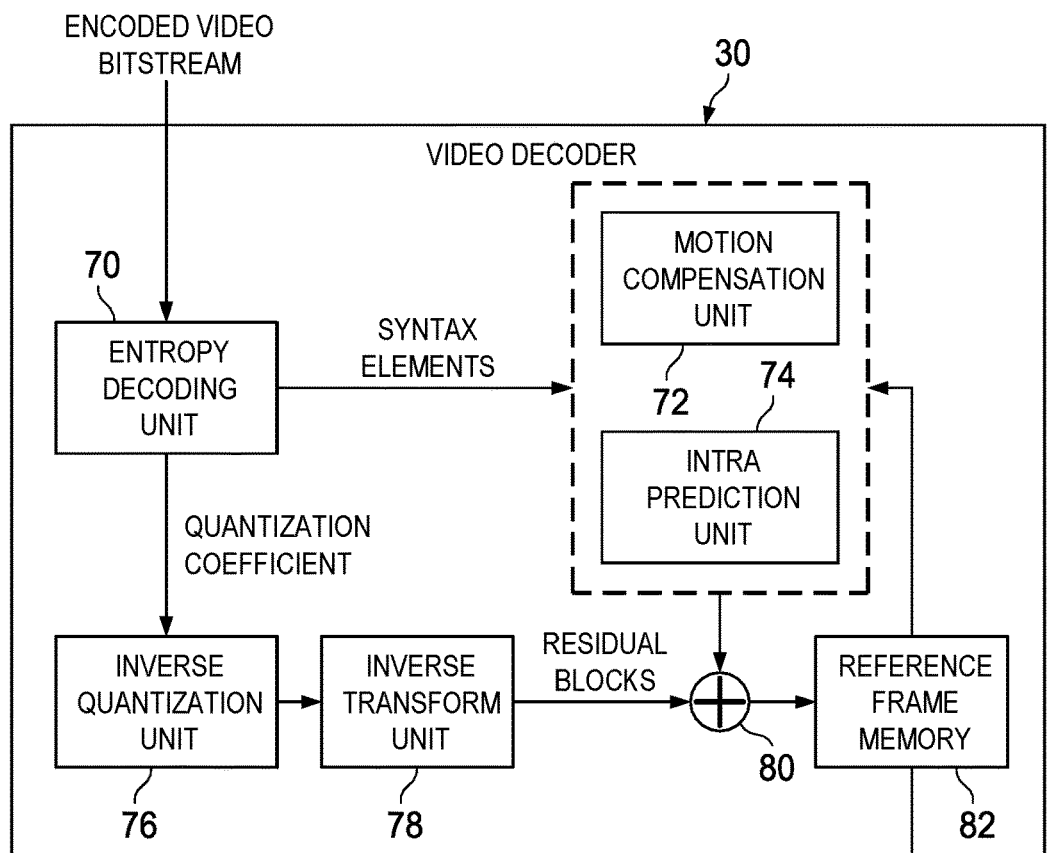
FIG. 3 is a block diagram illustrating an example of a video decoder that may implement partitioning techniques.

FIG. 3 is a block diagram illustrating an example of video decoder 30 that may implement video coding techniques. In the example of FIG. 3, video decoder 30 includes an entropy decoding unit 70, motion compensation unit 72, intra-prediction unit 74, inverse quantization unit 76, inverse transformation unit 78, reference frame memory 82, and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 of the video decoder 30 entropy decodes the bitstream to generate quantized coefficients, motion vectors or intra-prediction mode indicators, and other syntax elements. Entropy decoding unit 70 forwards the motion vectors and other syntax elements to motion compensation unit 72. Video decoder 30 may receive the syntax elements at the video slice level and/or the video block level.

When the video slice is coded as an intra-coded (I) slice, intra-prediction unit 74 may generate prediction data for a video block of the current video slice based on a signaled intra-prediction mode and data from previously decoded blocks of the current frame or picture. When the video frame is coded as an inter-coded (e.g., B, P, or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference frame memory 82.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Data for a texture image corresponding to a depth map may be stored in reference frame memory 82. Motion compensation unit 72 may also be configured to inter-predict depth blocks of a depth map.

Image and video compression has experienced rapid growth, leading to various coding standards. Such video coding standards include ITU-T H.261, International Organization for Standardization/International Electrotechnical Commission (ISO/IEC) MPEG-1 Part 2, ITU-T H.262 or ISO/IEC MPEG-2 Part 2, ITU-T H.263, ISO/IEC MPEG-4 Part 2, Advanced Video Coding (AVC), also known as ITU-T H.264 or ISO/IEC MPEG-4 Part 10, and High Efficiency Video Coding (HEVC), also known as ITU-T H.265 or MPEG-H Part 2. AVC includes extensions such as Scalable Video Coding (SVC), Multiview Video Coding (MVC) and Multiview Video Coding plus Depth (MVC+D), and 3D AVC (3D-AVC). HEVC includes extensions such as Scalable HEVC (SHVC), Multiview HEVC (MV-HEVC), and 3D HEVC (3D-HEVC). There is also a new video coding standard, named Versatile Video Coding (VVC), being developed by the joint video experts team (WET) of ITU-T and ISO/IEC. While the VVC standard has several working drafts, one Working Draft (WD) of VVC in particular, namely B. Bross, J. Chen, and S. Liu, "Versatile Video Coding (Draft 4)," JVET-M1001, 13th JVET Meeting, January 2019 (VVC Draft 4) is referenced herein.

When performing video coding, video is separated into frames. The frames are partitioned into blocks of pixels. Each pixel block, which may be referred to as a coding tree unit (CTU) or an image block, is then compressed by intra-prediction and/or inter-prediction. Intra-prediction matches each image block to one or more reference samples in the frame. An intra-prediction mode is then encoded to indicate a relationship between the image block and the reference sample(s). The encoded intra-prediction mode takes up less space than the image pixels. Inter-prediction operates in a similar manner for image blocks matched between frames.

Partitioning systems are configured to split image blocks into sub-blocks. For example, a tree structure employing various split modes can be employed to split a node (e.g., a block) into child nodes (e.g., sub-blocks). Different split modes can be employed to obtain different partitions. Further, split modes can also be applied recursively to further subdivide nodes.

Figure 4:
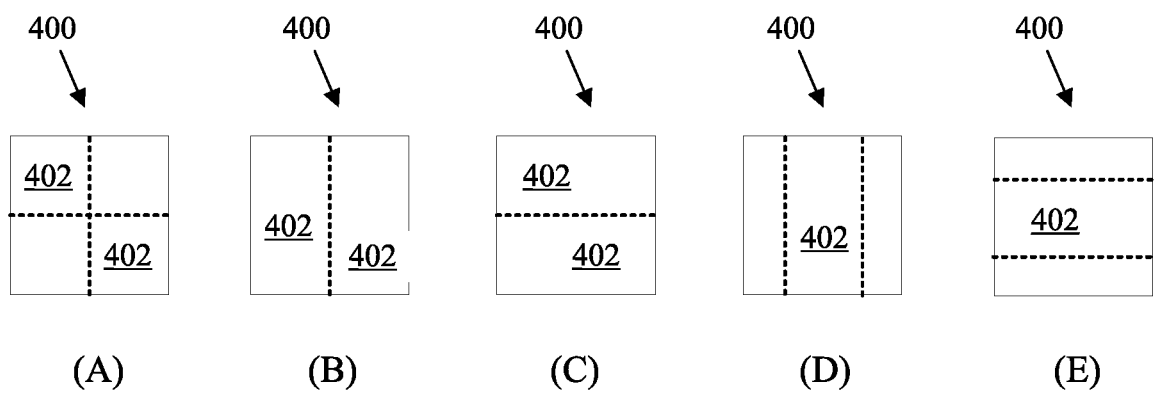
FIGS. 4A-E collectively illustrate a block subjected to one of the various partitioning types.

FIGS. 4A-E collectively illustrate a block 400 (e.g., a CTU) subjected to one of the various partitioning types. The block 400 in FIG. 4A has been quad-tree (QT) partitioned (a.k.a., split) into four sub-blocks 402. The blocks 400 in FIGS. 4B-C have been binary-tree (BT) partitioned into two sub-blocks 402. For binary-tree splitting, there are two splitting types. FIG. 4B illustrates vertical binary-tree partitioning and FIG. 4C illustrates horizontal binary-tree partitioning. Tree types other than quad-tree and binary-tree are supported. For example, vertical center-side triple-tree (TT) partitioning is shown in FIG. 4D, and horizontal center-side TT partitioning is shown in FIG. 4E. TT partitioning may also be referred to as ternary-tree partitioning or center-side TT partitioning. In FIGS. 4D-4E, the blocks 400 are split into three of the sub-blocks 402. The partitioning process may be iterated to split the blocks 400 until the minimum allowed quad-tree leaf node size is reached.

The QT-BTTT coding structure described above (a.k.a., quad tree plus multitree (QT-MTT)) may be used to partition a root node into a plurality of leaf nodes. First, the root node may be partitioned recursively by only quad-tree partitioning into one or more quad-tree leaf nodes, and the quad-tree leaf nodes may be further split using either binary-tree partitioning or triple-tree partitioning into leaf nodes of the coding tree. This coding tree structure is described in X. Li, H.-C. Chuang, J. Chen, M. Karczewicz, L. Zhang, X. Zhao, A. Said, "Multi-Type-Tree," JVET-D0117, 4th NET Meeting (Chengdu, China), October 2016.

A coding tree node (e.g., a CTU) can be split by quad-tree partitioning (as in FIG. 4A), vertical binary-tree partitioning (as in FIG. 4B), horizontal binary-tree partitioning (as in FIG. 4C), vertical triple tree partitioning (as in FIG. 4D), and horizontal triple tree partitioning (as in FIG. 4E). The leaf node of a coding tree is often referred to as a coding unit (CU). A coding tree node may be associated with a transform tree node (TTN). A TTN is a region partitioned from a CTU by a coding tree. The transform tree node is implicitly partitioned into smaller child transform tree nodes when the width or height of the transform tree node is greater than the maximum TU size. The maximum TU is the largest dimensions a TU can employ in a video sequence. A leaf node of a transform tree is often referred to as a transform unit (TU).

In VVC Draft 4, the maximum coding tree unit (CTU) size is 128×128, and the maximum TU size (denoted as maxTrSize) is fixed as 64×64. A transform tree node with a width (tbWidth) or a height (tbHeight) larger than the maximum TU size is partitioned into multiple TUs with width equal to min(tbWidth, maxTrSize) and height equal to min(tbHeight, maxTrSize), where min(a, b) is the minimum value between a and b. The TU partitioning in VVC Draft 4 is as follows.

When both the width and height of a transform tree node (denoted as tbWidth and tbHeight) are greater than maxTrSize, a quad-tree split is used to partition the transform tree node into four equal-sized child transform tree nodes of which the width is equal to tbWidth/2 and the height is equal to tbHeight/2.

When the width of a transform node is greater than maxTrSize but the height of the transform tree node is not greater than maxTrSize, a vertical binary tree split is used to partition the transform tree node into two equal-sized child tree nodes with width being equal to tbWidth/2 and height being equal to tbHeight.

When the height of a transform node is greater than maxTrSize but the width of the transform tree node is not greater than maxTrSize, a horizontal binary tree split is used to partition the transform tree node into two equal-sized child tree nodes with width being equal to tbWidth and height being equal to tbHeight/2.

The maxTrSize value may be signaled in the Sequence Parameter Set (SPS) rather than being a fixed value of 64. For example, in HEVC the maxTrSize is signaled via two syntax elements, i.e., log 2 min transform block size minus2 and log 2 diff max min transform block size in the SPS. Possible maxTrSize values may be 64, 32 and 16.

In hardware video codec pipeline design, blocks are often arranged in an S×S block based pipeline structure, where S=64. A coding tree unit corresponds to one or more S×S non-overlapping regions, and each region is named a pipeline block. The TU processing order should not violate the S×S pipeline structure. That is, all TUs in one S×S pipeline block should be processed before the TUs in a next S×S pipeline block are processed.

In the case of a 128×64 transform tree node and a maxTrSize of 32, the 128×64 transform tree node corresponds to two 64×64 pipeline blocks. Using the TU partition method in VVC Draft 4, the 128×64 transform tree node is first split into four 64×32 transform tree nodes by a quad-tree split, and each 64×32 transform tree node is further split into 32×32 transform tree nodes by vertical binary tree split.

Figure 5:
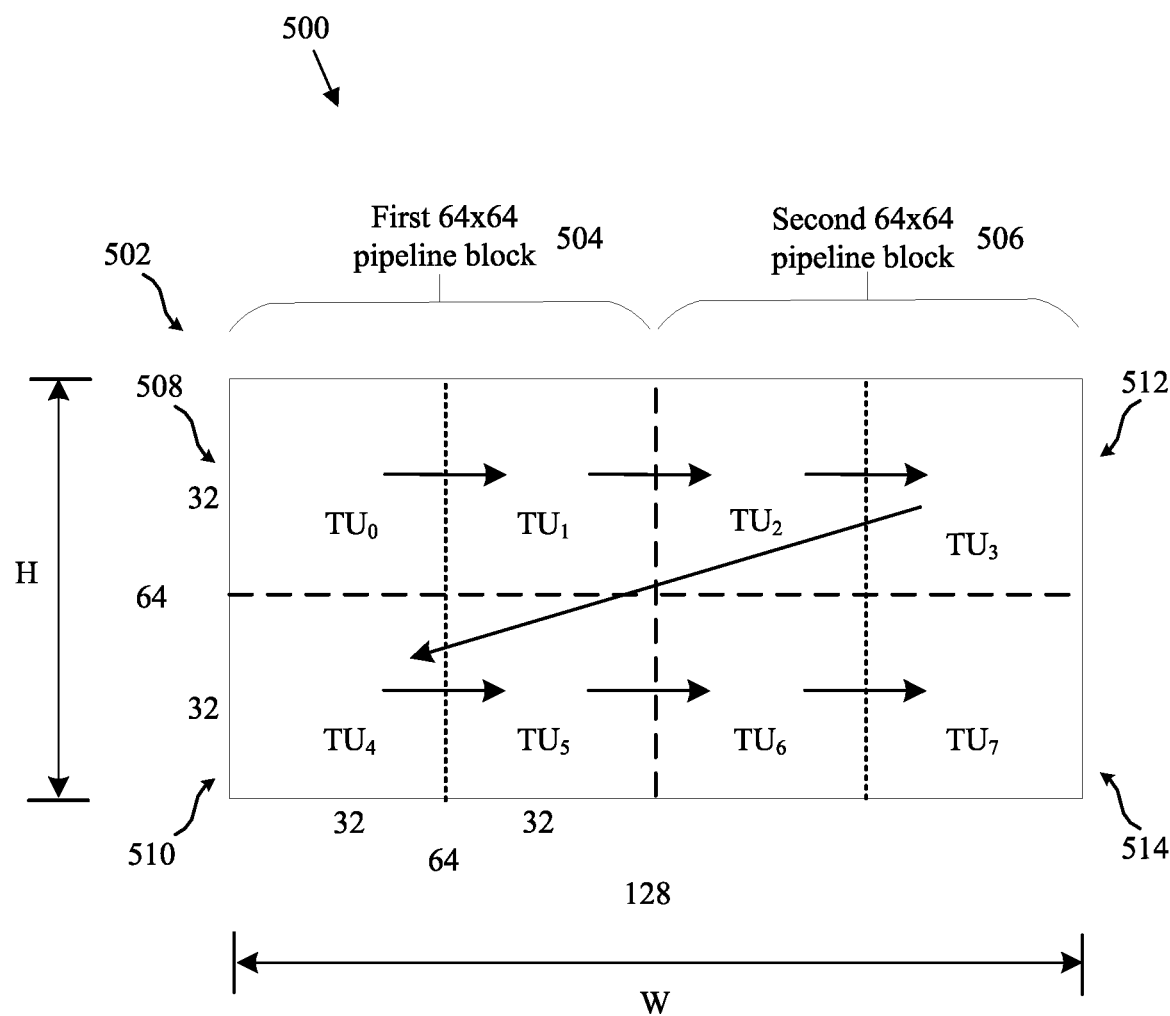
FIG. 5 illustrates an example of a transform unit partitioning technique that violates an S×S pipeline structure.

FIG. 5 illustrates an example transform unit partitioning technique 500 that violates the S×S pipeline structure. The example of FIG. 5 depicts a TTN 502 having a width W=128 and a height H=64. The width and height are measured in a number of luma samples. The TTN 502 has been partitioned or split into a first 64×64 pipeline block 504 and a second 64×64 pipeline block 506, which may be referred to as child TTNs 508, 510, 512, 514 of the TTN 502. The child TTNs

508, 510, 512, 514 have a size of 64×32. Each of the first and second 64×64 pipeline blocks 504, 506 has been partitioned or split into 32×32 TUs labeled from 0 to 7. While the example in FIG. 5 provides certain dimensions, those skilled in the art will recognize that other dimensions may be encountered in practical applications.

As shown in FIG. 5, the TU processing order in the 128×64 TTN is illustrated (by arrows), where $TU_N$ is processed after $TU_{N-1}$ (N=1, . . . , 7). In FIG. 5, $TU_0$, $TU_1$, $TU_4$ and $TU_5$ are in the first 64×64 pipeline block 504, and $TU_2$, $TU_3$, $TU_6$ and $TU_7$ are in the second 64×64 pipeline block 506. As shown, $TU_2$ in the second 64×64 pipeline block 506 is processed immediately after $TU_1$ in the first 64×64 pipeline block 504. However, not all of the TUs in the first pipeline block 504 have been processed when $TU_2$ in the second 64×64 pipeline block 506 is processed. That is, $TU_4$ and $TU_5$ in the first 64×64 pipeline block 504 have not been processed yet when $TU_2$ in the second 64×64 pipeline block 506 is processed. This is a problem because $TU_2$ may need to reference $TU_4$ and $TU_5$ in order to be properly processed. Therefore, the TU partitioning technique 500 in VVC Draft 4 violates the 64×64 pipeline structure.

Disclosed herein is an improved TU partitioning method that maintains the integrity of the S×S pipeline structure. As will be more fully explained below, the method provides techniques whereby a rectangular transform tree node (TTN) is initially partitioned using either a vertical binary tree split or a horizontal binary tree split when a maximum TU size for the TTN is smaller than both a first TTN dimension and a second TTN dimension. This generates child TTNs (e.g., square child TTNs). When a first child TTN dimension and a second child TTN dimension are larger than the maximum TU size, the child TTNs are partitioned using a quadtree split to generate transform units (TUs). Otherwise, when the first child TTN dimension and the second child TTN dimension are the same as the maximum TU size, the child TTNs are the TUs as initially split. By partitioning the TTN in this manner (e.g., vertical or horizontal binary tree split of the TTN prior to any quadtree split), the pipeline block structure used in the versatile video coding (VVC) standard is not violated. Therefore, the coder/decoder (a.k.a., "codec") in video coding is improved (e.g., the integrity of the S×S pipeline structure or process is maintained) relative to current codecs. As a practical matter, the improved video coding process may eliminate errors or failures in the codec, which offers the user a better user experience when videos are sent, received, and/or viewed.

Figure 6:
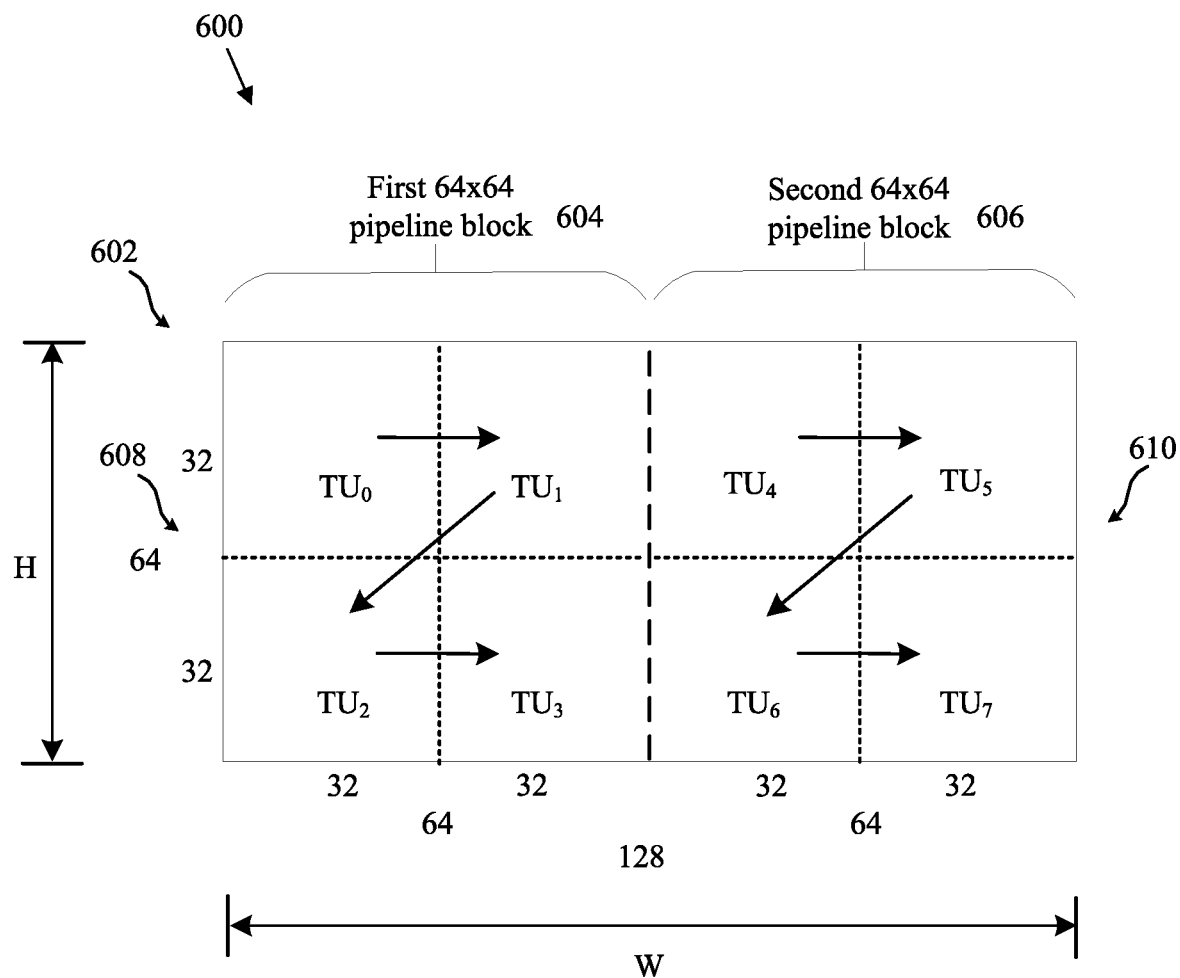
FIG. 6 illustrates an embodiment of a transform unit partitioning technique that maintains the integrity of the S×S pipeline structure.

FIG. 6 illustrates an embodiment of a transform unit partitioning technique 600 for a TTN 602 that maintains the integrity of the S×S pipeline structure. In the embodiment of FIG. 6, the QT-MTT coding tree structure of VVC Draft 4 (see FIG. 4) is utilized, the CTU size is 128×128, and a maximum TU size is smaller than both the width and the height (e.g., the sides) of the TTN 602. In an embodiment, the maximum TU size is signaled in the bitstream (e.g., in the SPS).

When the TTN 602 has a width W=128 and a height H=64 and the maximum TU size is smaller than 64 (e.g., 32), the TTN 602 is initially partitioned using a vertical BT split to generate two child TTNs 608, 610 each with a size of 64×64. This is in contrast to the transform unit partitioning technique 500 of FIG. 5 where the TTN 502 is initially partitioned using a QT split, which generates four child TTNs 508, 510, 512, 514 with a size of 64×32 as specified in VVC Draft 4.

After the initial vertical BT split shown in FIG. 6, each child TTN 608, 610 is further partitioned using a QT split to generate the TUs (e.g., the TUs labeled from 0 to 7) when the child TTN 608 and the child TTN 610 are larger than the maximum TU size. Depending on the size of the child TTNs 608, 610 relative to the maximum TU size, more than one QT split may be performed before the maximum TU size is reached. When the child TTN 608 and the child TTN 610 are less than or equal to the maximum TU size, the child TTNs 608, 610 correspond to the TUs. That is, the child TTNs 608, 610 are determined to be TUs. In FIG. 6, the 32×32 TUs are labeled from 0 to 7.

Using the transform unit partitioning technique 600 of FIG. 6, the integrity of the S×S pipeline structure is maintained (as shown by arrows). That is, all of the TUs in the first 64×64 pipeline block 604 are processed before any of the TUs in the second 64×64 pipeline block 606.

Notably, the transform unit partitioning technique 600 of FIG. 6 is well suited for the partitioning of a rectangular TTN (e.g., TTN 602) having a first TTN dimension (e.g., 128) different than a second TTN dimension (e.g., 64). As shown, the transform unit partitioning technique 600 is able to generate child TTNs (e.g., child TTNs 608, 610) having a first child TTN dimension (e.g., 64) equal to a second child TTN dimension (e.g., 64) when the maximum TU size (e.g., 32) for the TU is smaller than the first TTN dimension and the second TTN dimension.

In practical applications, the TTN 602 and the child TTNs 608, 610 may have dimensions other than those shown in FIG. 6. In addition, the maximum TU size may be different than 32 in practical applications. In an embodiment, the TTN 602, the child TTNs 608, 610, and the maximum TU size are measured in luma samples.

In an embodiment, the TTN 602 is partitioned using the vertical BT split shown in FIG. 6 when the first TTN dimension is 2N luma samples, the second TTN dimension is N luma samples, and the maximum TU size is ½ N luma samples. In an embodiment, N=64. However, other dimensions or sizes may be used in practical applications.

In an embodiment, a TTN depth of all TUs (e.g., the TUs labeled 0-7) in the TTN (e.g., TTN 602) is set to one (1). In an embodiment, a TTN depth of all TUs in the TTN is set according to a number of splits needed to obtain the TUs.

A modified transform tree( ) syntax table, which is based on the transform tree( ) syntax table in VVC Draft 4, is provided in Table 1, below. In the table, the improved TU partitioning method corresponds to the italicized parts (i.e., from line 4 to line 21). In Table 1, tbWidth and tbHeight denote the width and height of a transform tree node (e.g., TTN 602), and MaxTbSizeY denotes the maximum TU size. The implicit TU partition method in VVC draft 4 is found in lines 8 to 20.

For a 128×64 transform tree node (e.g., TTN 602) and maxTbSizeY being less than 64 (e.g., 32), the condition "tbWidth>64 && tbHeight==64 && MaxTbSizeY<64" is true. Thus, the transform tree node is further split into two 64×64 transform tree nodes by a vertical binary tree split. Each of the two 64×64 child transform tree nodes are further split into transform units with quad tree split.

When the condition "tbWidth>64 && tbHeight==64 && MaxTbSizeY<64" is false for a transform tree node, the TU partition method in VVC Draft 4 is used.

TABLE 1

An example of transform tree syntax

```
transform_tree( x0, y0, tbWidth, tbHeight, treeType) {
  InferTuCbfLuma = 1
  if( IntraSubPartSplitType == NO_ISP_SPLIT ) {
    if ( tbWidth > 64 && tbHeight == 64 && MaxTbSizeY < 64 {
      transform_tree( x0, y0, 64, 64, treeType )
      transform_tree( x0 + 64, y0, 64, 64, treeType )
    } else {
      if( tbWidth > MaxTbSizeY || tbHeight > MaxTbSizeY ) {
        trafoWidth = ( tbWidth > MaxTbSizeY ) ? (tbWidth / 2) : tbWidth
        trafoHeight = ( tbHeight > MaxTbSizeY ) ? (tbHeight / 2) : tbHeight
        transform_tree( x0, y0, trafoWidth, trafoHeight, treeType )
        if( tbWidth > MaxTbSizeY )
          transform_tree( x0 + trafoWidth, y0, trafoWidth, trafoHeight, treeType )
        if( tbHeight > MaxTbSizeY )
          transform_tree( x0, y0 + trafoHeight, trafoWidth, trafoHeight, treeType )
        if( tbWidth > MaxTbSizeY && tbHeight > MaxTbSizeY )
          transform_tree( x0 + trafoWidth, y0 + trafoHeight, trafoWidth,
            trafoHeight, treeType )
      } else {
        transform_unit( x0, y0, tbWidth, tbHeight, treeType, 0 )
      }
    }
  } else if( cu_sbt_flag ) {
    ...
}
```

Figure 7:
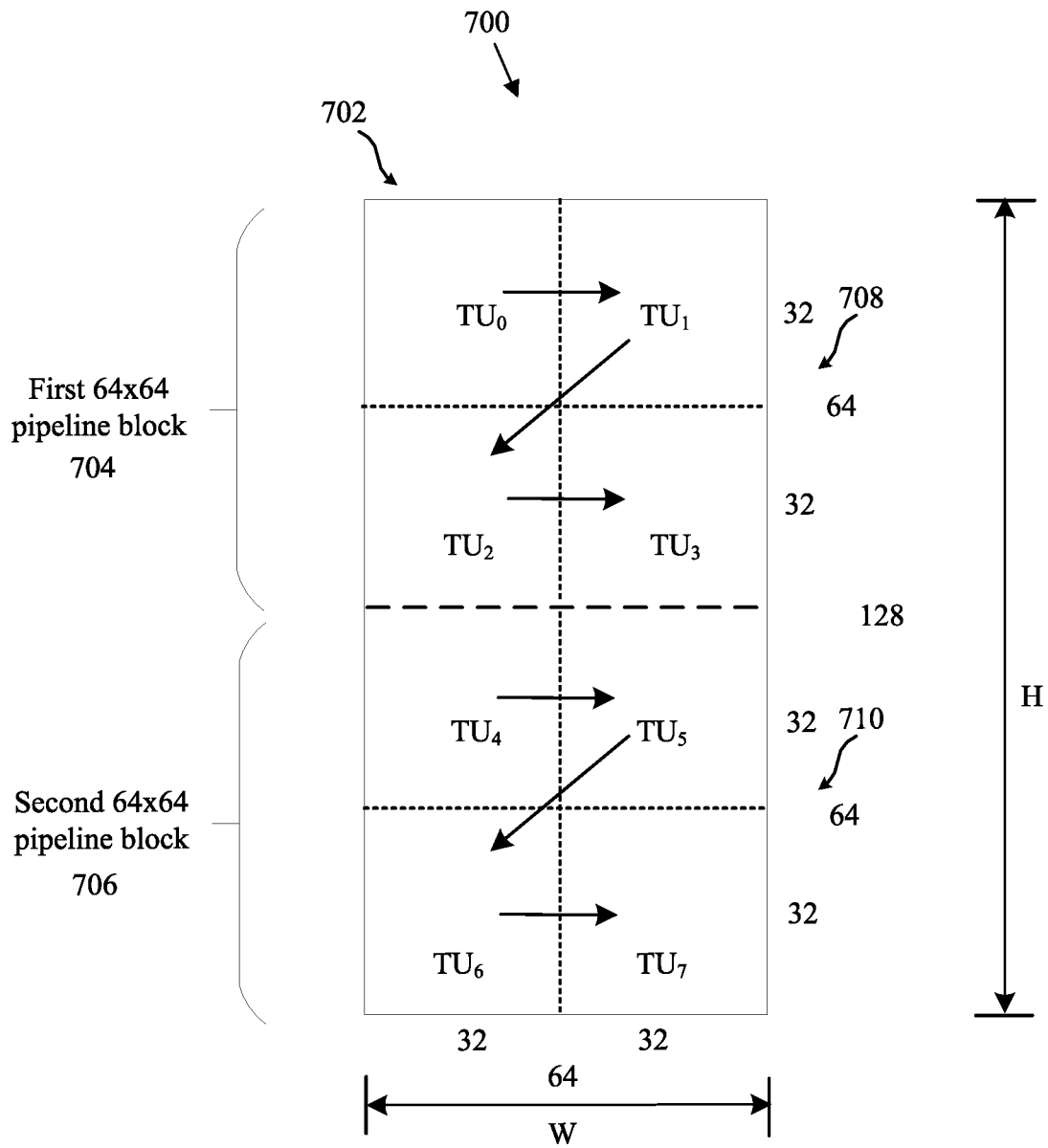
FIG. 7 illustrates an embodiment of a transform unit partitioning technique that maintains the integrity of the S×S pipeline structure.

FIG. 7 illustrates an embodiment of a transform unit partitioning technique 700 for a TTN 702 that maintains the integrity of the S×S pipeline structure. In the embodiment of FIG. 7, the QT-MTT coding tree structure of VVC Draft 4 (see FIG. 4) is utilized, the CTU size is 128×128, and a maximum TU size is smaller than both dimensions (e.g., sides) of the TTN 702. In an embodiment, the maximum TU size is signaled in the bitstream (e.g., in the SPS).

When the TTN 702 has a width W=64 and a height H=128 and the maximum TU size is smaller than 64 (e.g., 32), the TTN 702 is initially partitioned using a horizontal BT split to generate two child TTNs 708, 710 each with a size of 64×64. This is in contrast to the transform unit partitioning technique 500 of FIG. 5 where the TTN 502 is initially partitioned using a QT split, which generates four child TTNs 508, 510, 512, 514 with a size of 64×32 as specified in VVC Draft 4.

After the initial horizontal BT split shown in FIG. 7, each child TTN 708, 710 is further partitioned using a QT split to generate the TUs (e.g., the TUs labeled from 0 to 7) when the child TTN 708 and the child TTN 710 are larger than the maximum TU size. Depending on the size of the child TTNs 708, 710 relative to the maximum TU size, more than one QT split may be performed before the maximum TU size is reached. When the child TTN 708 and the child TTN 710 are less than or equal to the maximum TU size, the child TTNs 708, 710 correspond to the TUs. That is, the child TTNs 708, 710 are determined to be TUs. In FIG. 7, the 32×32 TUs are labeled from 0 to 7.

Using the transform unit partitioning technique 700 of FIG. 7, the integrity of the S×S pipeline structure is maintained (as shown by arrows). That is, all of the TUs in the first 64×64 pipeline block 704 are processed before any of the TUs in the second 64×64 pipeline block 706.

A modified transform tree( ) syntax table, which is based on the transform tree( ) syntax table in VVC Draft 4, is provided in Table 2, below. In the table, the improved TU partitioning method corresponds to the italicized parts (i.e., from line 4 to line 24). In Table 2, tbWidth and tbHeight denote the width and height of a transform tree node (e.g., TNN 702), and MaxTbSizeY denotes the maximum TU size.

For a 64×128 transform tree node (e.g., TTN 702) and maxTbSizeY being less than 64 (e.g., 32), the condition "tbWidth==64 && tbHeight>64 && MaxTbSizeY<64" is true. Thus, the transform tree node is further split into two 64×64 transform tree nodes by a horizontal binary tree split. Each of the two 64×64 child transform tree nodes are further split into transform units with quad tree split, the same as in VVC Draft 4.

TABLE 2

An example of transform tree syntax

```
transform_tree( x0, y0, tbWidth, tbHeight, treeType) {
  InferTuCbfLuma = 1
  if( IntraSubPartSplitType == NO_ISP_SPLIT ) {
    if ( tbWidth > 64 && tbHeight == 64 && MaxTbSizeY < 64 ) {
      transform_tree( x0, y0, 64, 64, treeType )
      transform_tree( x0 + 64, y0, 64, 64, treeType )
    } else if ( tbWidth == 64 && tbHeight > 64 && MaxTbSizeY < 64 ) {
      transform_tree( x0, y0, 64, 64, treeType )
      transform_tree( x0, y0 + 64, 64, 64, treeType )
    } else {
      if( tbWidth > MaxTbSizeY || tbHeight > MaxTbSizeY ) {
        trafoWidth = ( tbWidth > MaxTbSizeY ) ? (tbWidth / 2) : tbWidth
        trafoHeight = ( tbHeight > MaxTbSizeY ) ? (tbHeight / 2) : tbHeight
        transform_tree( x0, y0, trafoWidth, trafoHeight, treeType)
```

TABLE 2-continued

An example of transform tree syntax

```
            if( tbWidth > MaxTbSizeY )
              transform_tree( x0 + trafoWidth, y0, trafoWidth, trafoHeight, treeType )
            if( tbHeight > MaxTbSizeY )
              transform_tree( x0, y0 + trafoHeight, trafoWidth, trafoHeight, treeType )
            if( tbWidth > MaxTbSizeY && tbHeight > MaxTbSizeY )
              transform_tree( x0 + trafoWidth, y0 + trafoHeight, trafoWidth,
                 trafoHeight, treeType )
         } else {
            transform_unit( x0, y0, tbWidth, tbHeight, treeType, 0 )
         }
      }
   } else if( cu_sbt_flag ) {
...
}
```

A modified transform tree( ) syntax table, which is based on the transform tree( ) syntax table in VVC Draft 4, is provided in Table 3. The table gives equivalent TU partition results as using syntax table in Table 2. This is because when MaxTrSize is 64, the TU partitioning method in VVC also splits a 128×64 transform tree node or a 64×128 transform tree node into 64×64 child nodes. Therefore, the condition check "MaxTbSizeY<64" in Table 2 is removed, to reduce computational complexity.

Similarly, the condition check "MaxTbSizeY<64" in Table 1 can be also removed, which gives the same TU results as using Table 1.

TABLE 3

An example of transform tree syntax

```
transform_tree( x0, y0, tbWidth, tbHeight, treeType) {
   InferTuCbfLuma = 1
   if( IntraSubPartSplitType == NO_ISP_SPLIT ) {
      if ( tbWidth > 64 && tbHeight == 64 ) {
         transform_tree( x0, y0, 64, 64, treeType )
         transform_tree( x0 + 64, y0, 64, 64, treeType )
      } else if ( tbWidth == 64 && tbHeight > 64 ) {
         transform_tree( x0, y0, 64, 64, treeType )
         transform_tree( x0, y0 + 64, 64, 64, treeType )
      } else {
         if( tbWidth > MaxTbSizeY | | tbHeight > MaxTbSizeY ) {
            trafoWidth = ( tbWidth > MaxTbSizeY ) ? (tbWidth / 2) : tbWidth
            trafoHeight = ( tbHeight > MaxTbSizeY ) ? (tbHeight / 2) : tbHeight
            transform_tree( x0, y0, trafo Width, trafoHeight, treeType )
            if( tbWidth > MaxTbSizeY )
               transform_tree( x0 + trafoWidth, y0, trafoWidth, trafoHeight, treeType )
            if( tbHeight > MaxTbSizeY )
               transform_tree( x0, y0 + trafoHeight, trafoWidth, trafoHeight, treeType )
            if( tbWidth > MaxTbSizeY && tbHeight > MaxTbSizeY )
               transform_tree( x0 + trafoWidth, y0 + trafoHeight, trafoWidth,
                  trafoHeight, treeType )
         } else {
            transform_unit( x0, y0, tbWidth, tbHeight, treeType, 0 )
         }
      }
   } else if( cu_sbt_flag ) {
...
}
```

A transform tree( ) syntax table modified based on the transform tree( ) syntax table in VVC draft 4 is provided in Table 4, which gives equivalent TU partition results as using syntax table in Table 2.

TABLE 4

An example of transform tree syntax

```
transform_tree( x0, y0, tbWidth, tbHeight, treeType) {
   InferTuCbfLuma = 1
   if( IntraSubPartSplitType == NO_ISP_SPLIT ) {
      if (tbWidth > 64 | | tbHeight > 64 ) {
         transform_tree( x0, y0, 64, 64, treeType )
         if( tbWidth > 64 )
            transform_tree( x0 + 64, y0, 64, 64, treeType )
         if( tbHeight > 64 )
```

TABLE 4-continued

An example of transform tree syntax

```
            transform_tree( x0, y0 + 64, 64, 64, treeType )
          if( tbWidth > 64 && tbHeight > 64 )
            transform_tree( x0 + 64, y0 + 64, 64, 64, treeType )
      } else if( tbWidth > MaxTbSizeY || tbHeight > MaxTbSizeY ) {
          trafoWidth = ( tbWidth > MaxTbSizeY ) ? (tbWidth / 2) : tbWidth
          trafoHeight = ( tbHeight > MaxTbSizeY ) ? (tbHeight / 2) : tbHeight
          transform_tree( x0, y0, trafoWidth, trafoHeight, treeType )
          if( tbWidth > MaxTbSizeY )
            transform_tree( x0 + trafoWidth, y0, trafoWidth, trafoHeight, treeType )
          if( tbHeight > MaxTbSizeY )
            transform_tree( x0, y0 + trafoHeight, trafoWidth, trafoHeight, treeType )
          if( tbWidth > MaxTbSizeY && tbHeight > MaxTbSizeY )
            transform_tree( x0 + trafoWidth, y0 + trafoHeight, trafoWidth,
              trafoHeight, treeType )
      } else {
          transform_unit( x0, y0, tbWidth, tbHeight, treeType, 0 )
          }
      }
    } else if( cu_sbt_flag ) {
...
}
```

Figure 8:
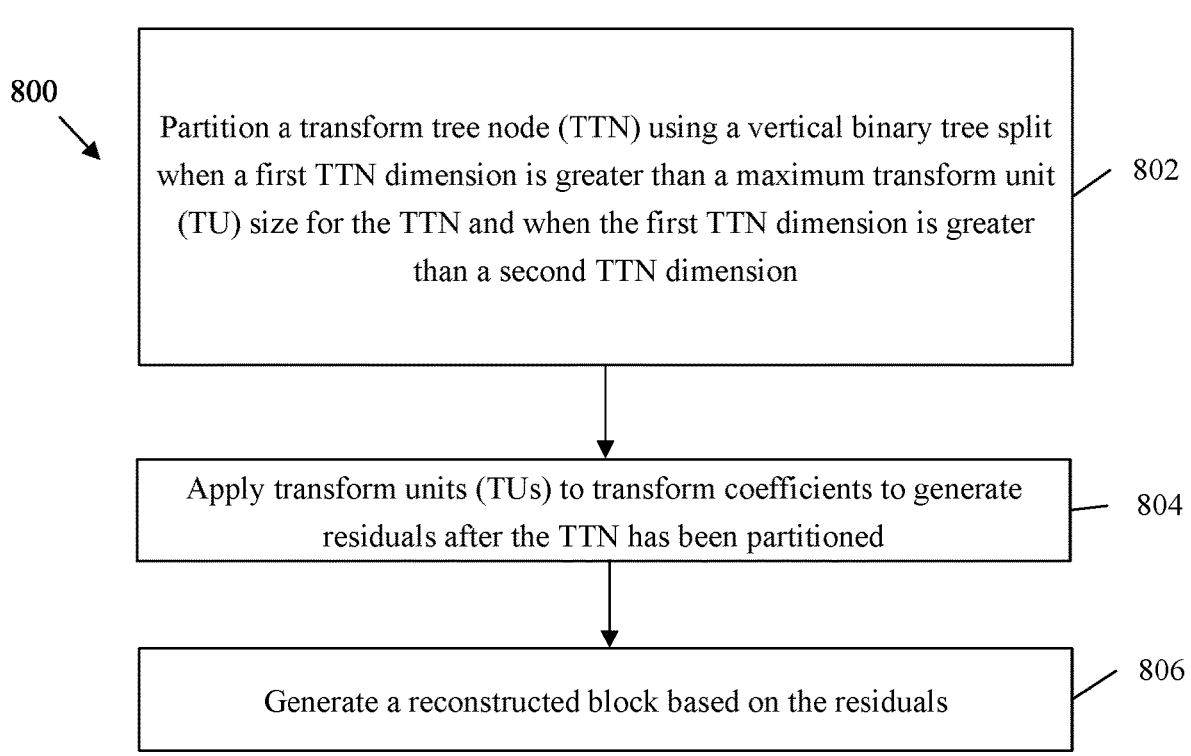
FIG. 8 is an embodiment of a method of decoding a coded video bitstream.

FIG. 8 is an embodiment of a method 800 of decoding a coded video bitstream implemented by a video decoder (e.g., video decoder 30). The method 800 may be performed after the decoded bitstream has been directly or indirectly received from a video encoder (e.g., video encoder 20). The method 800 improves the decoding process because the integrity of the S×S pipeline structure or process is maintained. Therefore, as a practical matter, the performance of a codec is improved, which leads to a better user experience.

In block 802, a transform tree node (e.g., TTN 602) is partitioned using a vertical binary tree split when a first TTN dimension is greater than a maximum transform unit (TU) size for the TTN and when the first TTN dimension is greater than a second TTN dimension. In an embodiment, the partitioning of the TTN generates generate child TTNs having a first child TTN dimension equal to a second child TTN dimension. In an embodiment, the method further comprises partitioning the child TTNs using a quadtree split to generate the TUs when the first child TTN dimension and the second child TTN dimension are larger than the maximum TU size, and determining that the child TTNs are the TUs when the first child TTN dimension and the second child TTN dimension are less than or equal to the maximum TU size.

In an embodiment, the vertical binary tree split is implemented according to the following syntax: verSplitFirst= (tbWidth>MaxTbSizeY && tbWidth>tbHeight)?1:0.

In an embodiment, the TTN is partitioned using the vertical binary tree split when the first TTN dimension is 2N luma samples, the second TTN dimension is N luma samples, and the maximum TU size is ½ N luma samples. In an embodiment, N=64 luma samples.

In an embodiment, the first TTN dimension, the second TTN dimension, the first child TTN dimension, and the second child TTN dimension are measured in a number of luma samples.

In block 804, transform units (TUs) to transform coefficients to generate residuals after the TTN has been partitioned. In an embodiment, a TTN depth of all TUs in the TTN is set to one (1). In an embodiment, a TTN depth of all TUs in the TTN is set according to a number of splits needed to obtain the TUs.

In block 806, a reconstructed block is generated based on the residuals.

Figure 9:
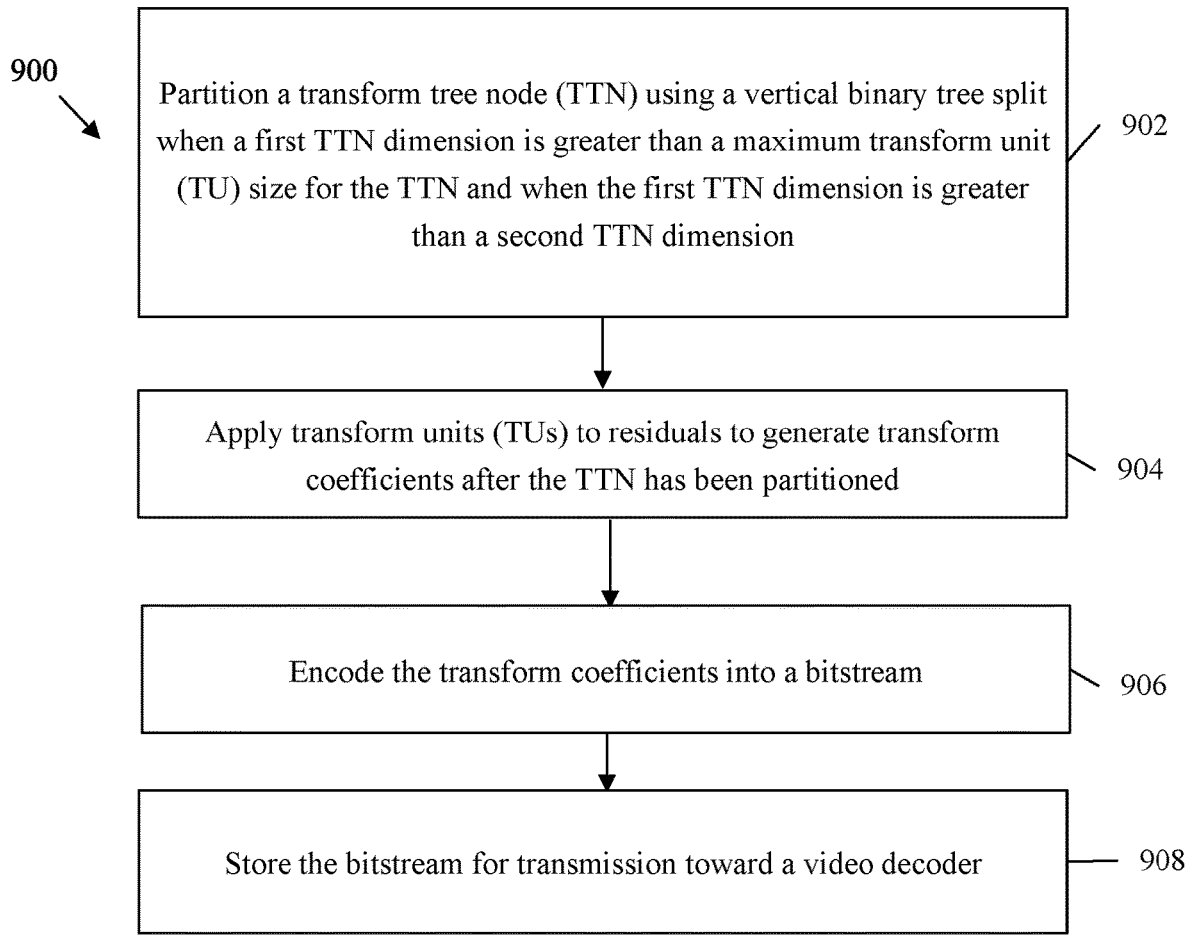
FIG. 9 is an embodiment of a method of encoding a video bitstream.

FIG. 9 is an embodiment of a method 900 of encoding a video bitstream implemented by a video encoder (e.g., video encoder 20). The method 900 may be performed when a picture (e.g., from a video) is to be encoded into a video bitstream and then transmitted toward a video decoder (e.g., video decoder 30). The method 900 improves the encoding process because the integrity of the S×S pipeline structure or process is maintained. Therefore, as a practical matter, the performance of a codec is improved, which leads to a better user experience.

In block 902, a transform tree node (e.g., TTN 602) is partitioned using a vertical binary tree split when a first TTN dimension is greater than a maximum transform unit (TU) size for the TTN and when the first TTN dimension is greater than a second TTN dimension. In an embodiment, the partitioning of the TTN generates generate child TTNs having a first child TTN dimension equal to a second child TTN dimension. In an embodiment, the method further comprises partitioning the child TTNs using a quadtree split to generate the TUs when the first child TTN dimension and the second child TTN dimension are larger than the maximum TU size, and determining that the child TTNs are the TUs when the first child TTN dimension and the second child TTN dimension are less than or equal to the maximum TU size.

In an embodiment, the vertical binary tree split is implemented according to the following syntax: verSplitFirst= (tbWidth>MaxTbSizeY && tbWidth>tbHeight)?1:0.

In an embodiment, the TTN is partitioned using the vertical binary tree split when the first TTN dimension is 2N luma samples, the second TTN dimension is N luma samples, and the maximum TU size is ½ N luma samples. In an embodiment, N=64 luma samples.

In an embodiment, the first TTN dimension, the second TTN dimension, the first child TTN dimension, and the second child TTN dimension are measured in a number of luma samples.

In block 904, transform units (TUs) are applied to residuals to generate transform coefficients after the TTN has been partitioned. In an embodiment, a TTN depth of all TUs in the TTN is set to one (1). In an embodiment, a TTN depth of all TUs in the TTN is set according to a number of splits needed to obtain the TUs.

In block 906, the transform coefficients are encoded into a bitstream. In block 908, the bitstream is stored for transmission toward a video decoder. The video bitstream may also be referred to as a coded video bitstream or an encoded video bitstream. Once received by the video decoder, the encoded video bitstream may be decoded (e.g., as described above) to generate or produce an image for display to a user on the display or screen of an electronic device (e.g., a smart phone, tablet, laptop, personal computer, etc.).

Figure 10:
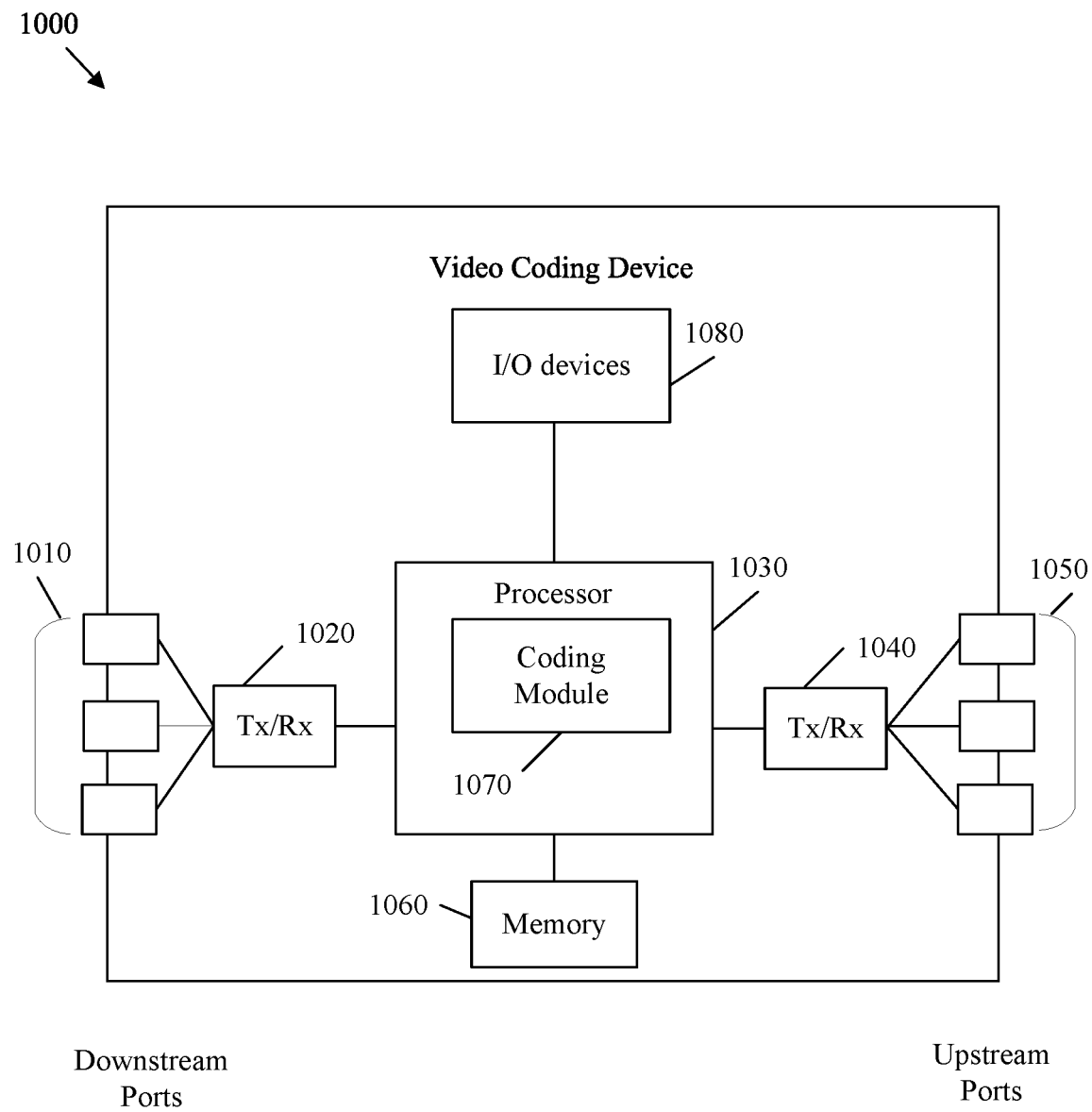
FIG. 10 is a schematic diagram of a video coding device.

FIG. 10 is a schematic diagram of a video coding device 1000 (e.g., a video encoder 20 or a video decoder 30) according to an embodiment of the disclosure. The video coding device 1000 is suitable for implementing the disclosed embodiments as described herein. The video coding device 1000 comprises ingress ports 1010 and receiver units (Rx) 1020 for receiving data; a processor, logic unit, or central processing unit (CPU) 1030 to process the data; transmitter units (Tx) 1040 and egress ports 1050 for transmitting the data; and a memory 1060 for storing the data. The video coding device 1000 may also comprise optical-to-electrical (OE) components and electrical-to-optical (EO) components coupled to the ingress ports 1010, the receiver units 1020, the transmitter units 1040, and the egress ports 1050 for egress or ingress of optical or electrical signals.

The processor 1030 is implemented by hardware and software. The processor 1030 may be implemented as one or more CPU chips, cores (e.g., as a multi-core processor), field-programmable gate arrays (FPGAs), application specific integrated circuits (ASICs), and digital signal processors (DSPs). The processor 1030 is in communication with the ingress ports 1010, receiver units 1020, transmitter units 1040, egress ports 1050, and memory 1060. The processor 1030 comprises a coding module 1070. The coding module 1070 implements the disclosed embodiments described above. For instance, the coding module 1070 implements, processes, prepares, or provides the various codec functions. The inclusion of the coding module 1070 therefore provides a substantial improvement to the functionality of the video coding device 1000 and effects a transformation of the video coding device 1000 to a different state. Alternatively, the coding module 1070 is implemented as instructions stored in the memory 1060 and executed by the processor 1030.

The video coding device 1000 may also include input and/or output (I/O) devices 1080 for communicating data to and from a user. The I/O devices 1080 may include output devices such as a display for displaying video data, speakers for outputting audio data, etc. The I/O devices 1080 may also include input devices, such as a keyboard, mouse, trackball, etc., and/or corresponding interfaces for interacting with such output devices.

The memory 1060 comprises one or more disks, tape drives, and solid-state drives and may be used as an overflow data storage device, to store programs when such programs are selected for execution, and to store instructions and data that are read during program execution. The memory 1060 may be volatile and/or non-volatile and may be read-only memory (ROM), random access memory (RAM), ternary content-addressable memory (TCAM), and/or static random-access memory (SRAM).

Figure 11:
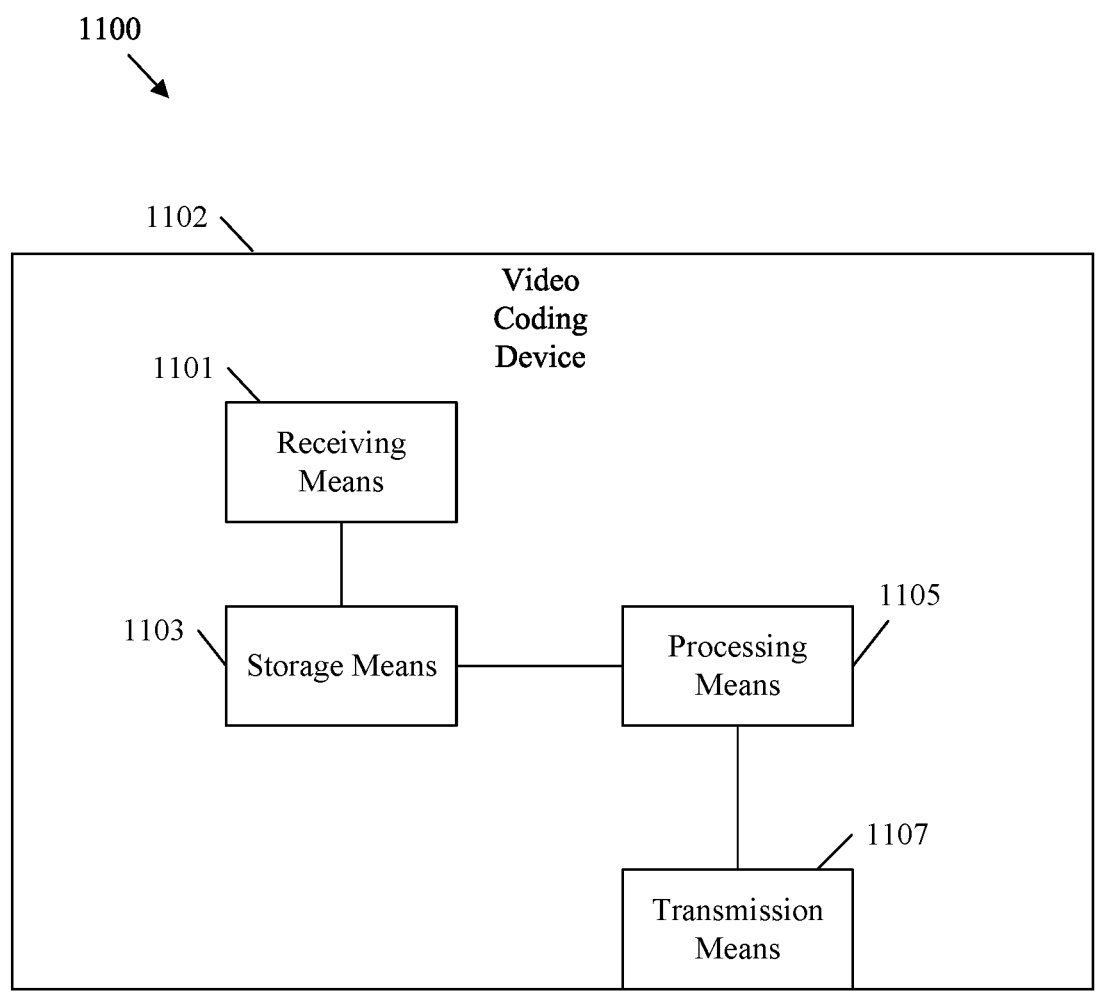
FIG. 11 is a schematic diagram of an embodiment of a means for coding.

FIG. 11 is a schematic diagram of an embodiment of a means for coding 1100. In embodiment, the means for coding 1100 is implemented in a video coding device 1102 (e.g., a video encoder 20 or a video decoder 30). The video coding device 1102 includes receiving means 1101. The receiving means 1101 is configured to receive a picture to encode or to receive a bitstream to decode. The video coding device 1102 includes transmission means 1107 coupled to the receiving means 1101. The transmission means 1107 is configured to transmit the bitstream to a decoder or to transmit a decoded image to a display means (e.g., one of the I/O devices 1080).

The video coding device 1102 includes a storage means 1103. The storage means 1103 is coupled to at least one of the receiving means 1101 or the transmission means 1107. The storage means 1103 is configured to store instructions. The video coding device 1102 also includes processing means 1105. The processing means 1105 is coupled to the storage means 1103. The processing means 1105 is configured to execute the instructions stored in the storage means 1103 to perform the methods disclosed herein.

It should also be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method implemented by a decoder, the method comprising:
   partitioning a transform tree node (TTN) using a vertical binary tree split when a first TTN dimension is greater than a maximum transform unit (TU) size for the TTN and when the first TTN dimension is greater than a second TTN dimension, wherein the vertical binary tree split is implemented according to the following syntax: verSplitFirst=(tbWidth>MaxTbSizeY && tbWidth>tbHeight) ? 1:0;
   applying TUs to transform coefficients to generate residual samples; and
   generating a reconstructed picture based on the residual samples.

2. The method of claim 1, wherein the partitioning of the TTN generates child TTNs having a first child TTN dimension equal to a second child TTN dimension.

3. The method of claim 1, further comprising:
   partitioning child TTNs using a quadtree split to generate the TUs when a first child TTN dimension and a second child TTN dimension are larger than the maximum TU size; and determining that the child TTNs are the TUs when the first child TTN dimension and the second child TTN dimension are less than or equal to the maximum TU size.

4. The method of claim 3, wherein the first child TTN dimension and the second child TTN dimension are measured in a number of luma samples.

5. The method of claim 1, wherein the first TTN dimension and the second TTN dimension are measured in a number of luma samples.

6. The method of claim 1, wherein a TTN depth of all TUs in the TTN is set to one (1).

7. The method of claim 1, wherein a TTN depth of all TUs in the TTN is set according to a number of splits needed to obtain the TUs.

8. The method of claim 1, wherein the TTN is partitioned using the vertical binary tree split when the first TTN dimension is 2N luma samples, the second TTN dimension is N luma samples, and the maximum TU size is ½ N luma samples.

9. The method of claim 8, wherein N=64 luma samples.

10. The method of claim 1, wherein the first TTN dimension is a width of the TTN and the second TTN dimension is a height of the TTN.

11. A method of encoding a video bitstream implemented by a video encoder, the method comprising:
partitioning a transform tree node (TTN) using a vertical binary tree split when a first TTN dimension is greater than a maximum transform unit (TU) size for the TTN and when the first TTN dimension is greater than a second TTN dimension, wherein the vertical binary tree split is implemented according to the following syntax: verSplitFirst=(tbWidth>MaxTbSizeY && tbWidth>tbHeight) ? 1:0;
applying TUs to residuals to generate transform coefficients after the TTN has been partitioned;
encoding the transform coefficients into a bitstream; and
storing the bitstream for transmission toward a video decoder.

12. The method of claim 11, wherein the partitioning of the TTN generates a child TTN having a first child TTN dimension equal to a second child TTN dimension.

13. The method of claim 11, further comprising:
partitioning child TTNs using a quadtree split to generate the TUs when a first child TTN dimension and a second child TTN dimension are larger than the maximum TU size; and
determining that the child TTNs are the TUs when the first child TTN dimension and the second child TTN dimension are less than or equal to the maximum TU size.

14. The method of claim 13, wherein the first child TTN dimension and the second child TTN dimension are measured in a number of luma samples.

15. The method of claim 11, wherein the first TTN dimension and the second TTN dimension are measured in a number of luma samples.

16. The method of claim 11, wherein a TTN depth of all TUs in the TTN is set according to a number of splits needed to obtain the TUs.

17. The method of claim 11, wherein the TTN is partitioned using the vertical binary tree split when the first TTN dimension is 2N luma samples, the second TTN dimension is N luma samples, and the maximum TU size is ½ N luma samples.

18. The method of claim 11, wherein the first TTN dimension is a width of the TTN and the second TTN dimension is a height of the TTN.

* * * * *